United States Patent
Bartow

(10) Patent No.: US 11,899,471 B2
(45) Date of Patent: Feb. 13, 2024

(54) METHODS AND APPARATUS TO GUIDE AN UNMANNED AERIAL VEHICLE FOR RECOVERY THEREOF

(71) Applicant: Insitu, Inc., Bingen, WA (US)

(72) Inventor: Matthew J. Bartow, Hood River, OR (US)

(73) Assignee: Insitu, Inc. (a subsidiary of The Boeing Company), Bingen, WA (US)

(*) Notice: Subject to any disclaimer, the term of this patent is extended or adjusted under 35 U.S.C. 154(b) by 230 days.

(21) Appl. No.: 17/368,531

(22) Filed: Jul. 6, 2021

(65) Prior Publication Data
US 2023/0010542 A1    Jan. 12, 2023

(51) Int. Cl.
*G05D 1/10* (2006.01)
(52) U.S. Cl.
CPC .................................. *G05D 1/101* (2013.01)
(58) Field of Classification Search
CPC ...................................................... G05D 1/101
See application file for complete search history.

(56) References Cited

U.S. PATENT DOCUMENTS

| | | | |
|---|---|---|---|
| 2016/0137311 A1* | 5/2016 | Peverill | B64C 25/68 701/16 |
| 2017/0291704 A1* | 10/2017 | Alegria | B64D 47/08 |

FOREIGN PATENT DOCUMENTS

| | | |
|---|---|---|
| WO | 2015108588 A2 | 7/2015 |
| WO | 2019182521 A1 | 9/2019 |
| WO | 2020209915 A2 | 10/2020 |

OTHER PUBLICATIONS

European Patent Office, "Extended European Search Report," issued in connection with European Application No. 22183091.2, dated Nov. 17, 2022, 9 pages.

* cited by examiner

*Primary Examiner* — Nicholas Kiswanto
*Assistant Examiner* — Christopher A Buksa
(74) *Attorney, Agent, or Firm* — HANLEY, FLIGHT & ZIMMERMAN, LLC

(57) ABSTRACT

Methods and apparatus to guide an unmanned aerial vehicle for recovery thereof are disclosed. A disclosed example apparatus to recover an aircraft or a payload thereof includes a tether line, and markers supported by the tether line at different positions of the tether line, the markers to be detected by the aircraft, the aircraft to be guided to engage the tether line by determining positions of the markers and calculating a position of at least a portion of the tether line based on the determined position of the markers.

23 Claims, 9 Drawing Sheets

METHODS AND APPARATUS TO GUIDE AN UNMANNED AERIAL VEHICLE FOR RECOVERY THEREOF

FIELD OF THE DISCLOSURE

This disclosure relates generally to aircraft and, more particularly, to methods and apparatus to guide an unmanned aerial vehicle for recovery thereof.

BACKGROUND

In recent years, unmanned aerial vehicles (UAVs) or drones have been used to fly significant distances to transport payloads (e.g., packages, supplies, equipment, etc.) or gather information. Some UAVs land on runways while others are captured in flight by UAV recovery systems. Capturing UAVs without the use of a runway enables greater flexibility in recovery locations. In particular, a UAV can be recovered in an unprepared area or on relatively smaller ships or other vessels or vehicles.

SUMMARY

An example apparatus to recover an aircraft or a payload thereof includes a tether line, and markers supported by the tether line at different positions of the tether line, the markers to be detected by the aircraft, the aircraft to be guided to engage the tether line by determining positions of the markers and calculating a position of at least a portion of the tether line based on the determined position of the markers.

An example non-transitory computer readable medium includes instructions, which when executed, cause at least one processor to determine positions of markers on a tether line, the markers placed at different positions of the tether line, calculate a position of at least a portion of the tether line based on the determined positions of the markers, and direct movement of an aircraft to engage the tether line based on the calculation position for recovery of the aircraft or a payload thereof.

An example method to guide an aircraft includes determining positions of markers, the markers placed at different positions of a tether line, calculating, by executing instructions with at least one processor, a position of at least a portion of the tether line based on the determined positions of the markers, and guiding the aircraft toward the tether line based on the calculated position of the at least the portion of the tether line for recovery of the aircraft or a payload thereof.

Figure 1:
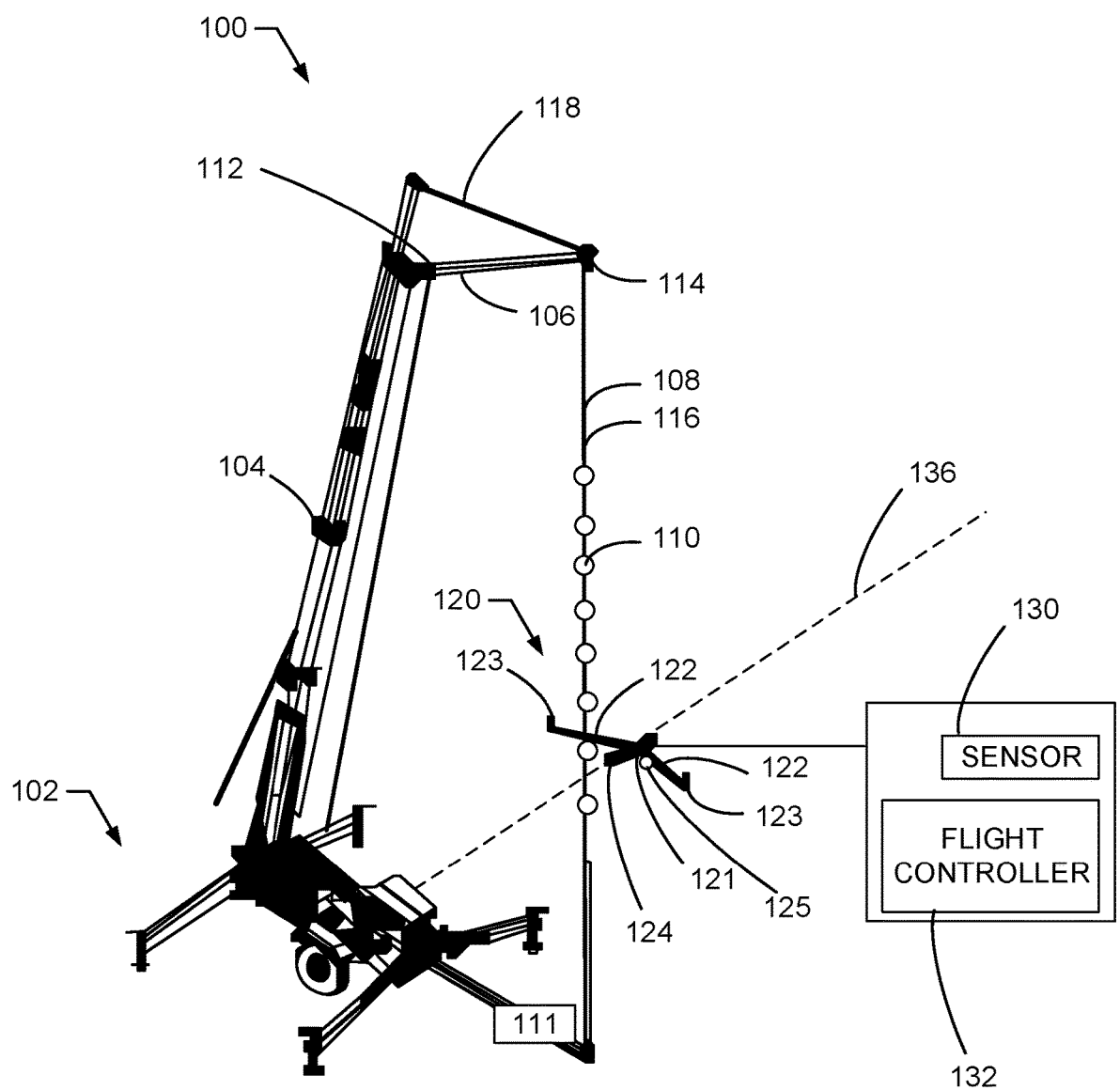
FIG. 1 depicts an unmanned aerial vehicle (UAV) recovery system in accordance with teachings of this disclosure.

The figures are not to scale. Instead, the thickness of the layers or regions may be enlarged in the drawings. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time +/−1 second.

DETAILED DESCRIPTION

Methods and apparatus to guide an unmanned aerial vehicle for recovery thereof are disclosed. Some UAVs are recovered by recovery systems, which employ a recovery tether line that is suspended vertically. In particular, a UAV contacts and/or impacts the tether line and, as a result, the UAV is decelerated and/or stopped from flight, thereby enabling recovery of the UAV without need for a runway. In some known implementations, a parachute or support beam is used to suspend the tether line for recovery of the UAV. Guiding the UAV to the tether line via known systems can require expensive and weight-adding differential GPS systems, for example. Further, known systems can require signal transmission, which can reveal a presence of the UAV in some scenarios. In contrast, examples disclosed herein can forego the need for signal transmissions that reveal the presence of the UAV (e.g., for covert operations, surveillance operations, etc.).

Examples disclosed herein enable highly accurate recovery of an aircraft (e.g., a UAV) via a stationary platform or a moving vehicle or vessel (e.g., a ship, etc.). Examples disclosed herein enable aircraft to be accurately guided for recovery without a significant amount of force and/or stress imparted to the aircraft. Further, examples disclosed herein do not necessitate complicated and expensive guidance systems to steer the aircraft to a tether line for recovery thereof. Accordingly, examples disclosed herein can eliminate the need for transmission of guidance signals by enabling guidance to be primarily performed by the aircraft. As a result, examples disclosed herein can enable covert operations of the aircraft by reducing (e.g., eliminating) a need for guidance signals to be transmitted to and from the aircraft.

According to examples disclosed herein, a tether line carrying detectable markers is supported and/or suspended (e.g., suspended vertically from Earth). In particular, the markers are positioned on the tether line at different heights and/or longitudinal positions along the tether line with a defined distance therebetween. An aircraft (e.g., a UAV) detects the markers and calculates and/or determines a position (e.g., a relative position) of at least a portion (e.g., a segment, a curved segment, a portion between two of the markers) of the tether line for guidance of the aircraft toward the tether line. In particular, a flight controller of the aircraft can determine a distance and/or position of the at least the portion of the tether line based on angles and/or angular positions of the markers relative to the aircraft in combination with a known distance between the markers. In some examples, the aircraft is directed to move between two adjacent markers (e.g., guided toward a center distance between the two adjacent markers) and, in turn, contact with the tether line.

In some examples, information and/or parameters associated with the tether line can be conveyed to the aforementioned flight controller via shapes and/or sequences of the markers detected by a sensor. For example, a sequence of different shapes of the markers can indicate a distance between markers (e.g., adjacent markers). Additionally or alternatively, different sizes and/or readable indicators can also convey information pertaining to the tether line. The readable indicators can include a bar code or QR code. In some examples, the markers can reflect light (e.g., visible light), lasers or infrared signals emitted from the aircraft, thereby enabling the flight controller to determine the positions of the markers. In some examples, geometric centers of the markers are calculated based on sensor data. In some examples, the markers are illuminated. In some such examples, ones of the markers can be illuminated in a pattern (e.g., a sequential pattern of illumination of the markers) to convey information to the aircraft for recovery thereof.

FIG. 1 depicts an unmanned aerial vehicle (UAV) recovery system 100 in accordance with teachings of this disclosure. The UAV recovery system 100 of the illustrated example includes a base 102, a mast 104, a boom 106, and a tether line 108 with markers 110. The example markers 110 are supported by the tether line 108 and placed along different longitudinal positions of the tether line 108. The example tether line 108 is operatively coupled to a tensioner 111. In this example, the boom 106 includes a first end (e.g., a proximal end) 112 at the mast 104 and a second end (e.g., a distal end) 114 of the boom 106 that is opposite the first end 112. The tether line 108 of the illustrated example extends from the mast 104 to the base 102, and is guided by the boom 106. Further, a first portion 116 of the tether line 108 extends from the base 102 and/or the ground associated with the base 102 to the second end 114 for contact with a UAV 120 while a second portion 118 of the tether line 108 extends between the second end 114 and the mast 104 to constrain/guide the tether line 108.

The example UAV 120 includes a fuselage 121, wings 122 each of which includes a distal capture portion 123, and a propulsion system 124. In this example, the distal capture portion 123 extends from at least one of the corresponding wings 122 generally along a direction of movement of the UAV 120. However, any appropriate type of capture or recovery mechanism can instead be implemented on any other portion and/or component (e.g., the fuselage 121) of the UAV 120. In this example, the UAV 120 includes a sensor 130 and a flight controller 132. In some examples, the UAV 120 carries and/or supports a payload (e.g., a package, a removable package, a tear away package, etc.) 125. In some such examples, the payload 125 is recovered by the tether line 108.

To recover and/or capture the UAV 120 as the UAV 120 moves along a flight path 136, one of the distal capture portions 123 is brought into contact with the first portion 116 of the tether line 108. As a result, the UAV 120 is decelerated. In turn, the UAV 120 is brought to a rest and remains attached to the tether line 108. In this example, the tether line 108 is suspended to support the tether line 108 in the air (e.g., substantially vertically in the air, within 5 degrees from vertical). In some other examples, the payload 125 is recovered from the UAV 120 when the UAV 120 is guided toward the tether line 108. The payload 125 can be torn off of the UAV 120 or separated from the UAV 120. In some examples, multiple ones of the payloads 125 are implemented and information conveyed from the tether line 108 instructs the UAV 120 as to a specific one of the payloads 125 to be left at the tether line 108.

To guide the UAV 120 toward the tether line 108 and/or the first portion 116, as will be discussed in greater detail below in connection with FIGS. 3-8, the sensor 130 of the UAV 120 detects the markers 110 and utilizes positions of the markers 110 to determine a position and/or distance of at least a portion of the tether line 108 relative to the UAV 120. For example, the distance to the tether line 108 is determined based on a known distance (e.g., a pre-programmed distance, a predefined distance, etc.) between two of the markers 110 in combination with triangulation and/or geometric calculations, for example. Accordingly, the UAV 120 utilizes the determined position and/or the distance of the tether line 108 to guide itself to contact and be captured by the tether line 108. Due to self-guiding navigation of the UAV 120, signals (e.g., differential GPS signals) transmitted and received from the UAV 120 are not needed.

In some examples, the tensioner 111 maintains a tension of the tether line 108 within a threshold range and/or at a nominal tension value (e.g., a tension value to facilitate capture of the UAV 120). In some examples, the tether line 108 is steered within a requisite range of the aforementioned flight path 136 for capture of the UAV 120.

While the example of FIG. 1 is shown in the context of a land-based stationary structure, examples disclosed herein can be applied to any stationary or moving support structure (e.g., a vehicle). Further, any appropriate number of the markers 110 can be implemented instead. In particular, examples disclosed herein can be implemented with two of the markers 110.

FIGS. 2A-2C depict an example recovery sequence in accordance with teachings of this disclosure. FIG. 2A depicts the UAV 120 approaching the tether line 108, which extends between a vessel 201 and a kite 202. In this example, the kite 202 is supporting the tether line 108 as the UAV 120 is being controlled and/or navigated based on the markers 110 so that the distal capture portion 123 (shown in FIG. 1) of the UAV 120 contacts the tether line 108 for deceleration and subsequent recovery of the UAV 120.

Turning to FIG. 2B, the UAV 120 is shown in contact with the tether line 108. In this example, the distal portion 123 shown in FIG. 1 is caught on the tether line 108. In this example, the distal portion 123 contacts the tether line 108 between two of the markers 110. In some examples, the UAV 120 is guided to a point that is centered between the two of the markers 110 (e.g., the two of the markers 110 adjacent to one another, the two of the markers 110 furthest from one another, etc.).

FIG. 2C depicts the UAV 120 captured on the tether line 108 and being winched toward the vessel 201. In this particular example, the tensioner 111 shown in FIG. 1 causes a motion (e.g., a reeling motion) of the tether line 108 and the UAV 120 toward the vessel 201 while the kite 202 maintains a lift force (e.g., an upward lift force in the view of FIG. 2C) to support the tether line 108. As a result, the UAV 120 is brought onto the vessel 201.

Figure 3:
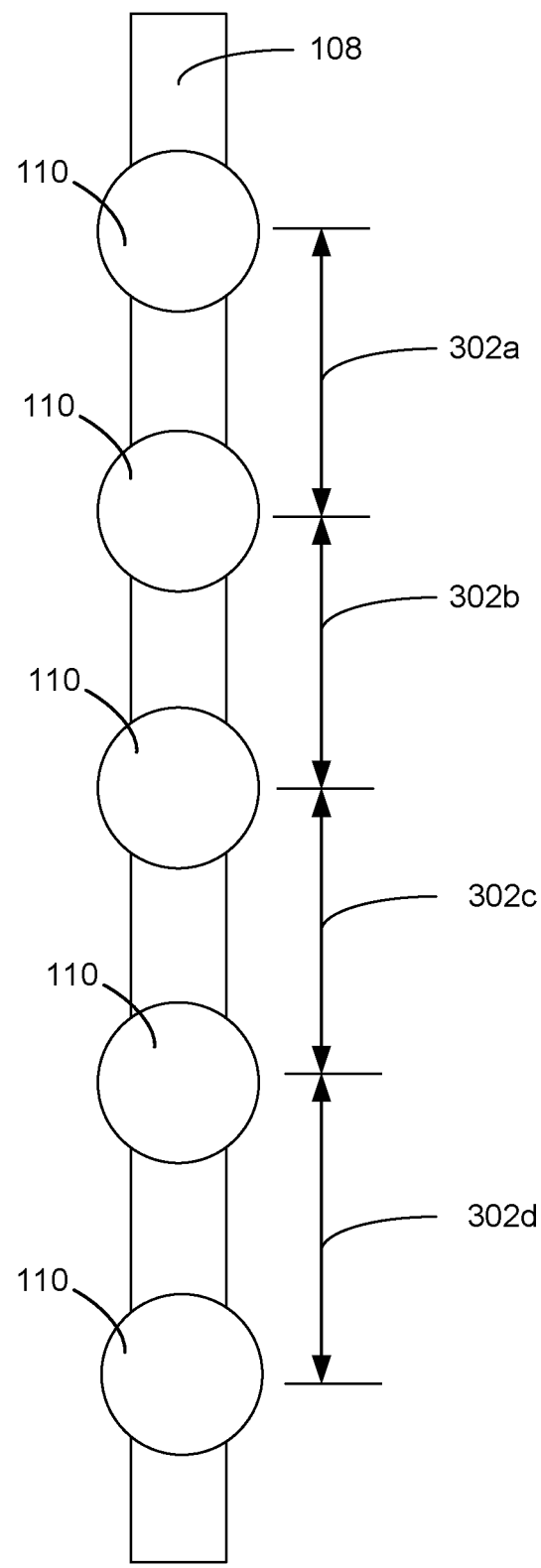
FIG. 3 is a detailed view of an example marker implementation of the example UAV recovery system of FIG. 1.

FIG. 3 is a detailed view of an example marker implementation of the example UAV recovery system 100 of FIG. 1. According to the illustrated example, the tether line 108 includes the markers 110, all of which are positioned at different positions/heights (e.g., longitudinal positions) of the tether line 108 and arranged equidistant to one another (e.g., at equal intervals) at distances 302 (hereinafter distances 302a, 302b, 302c, 302d). In other examples, at least two of the distances 302a, 302b, 302c, 302d are different from one another. Further, in this example, the markers 110 are spaced so that the UAV 120 can contact the tether line 108 a between two adjacent ones of the markers 110.

Figure 2:
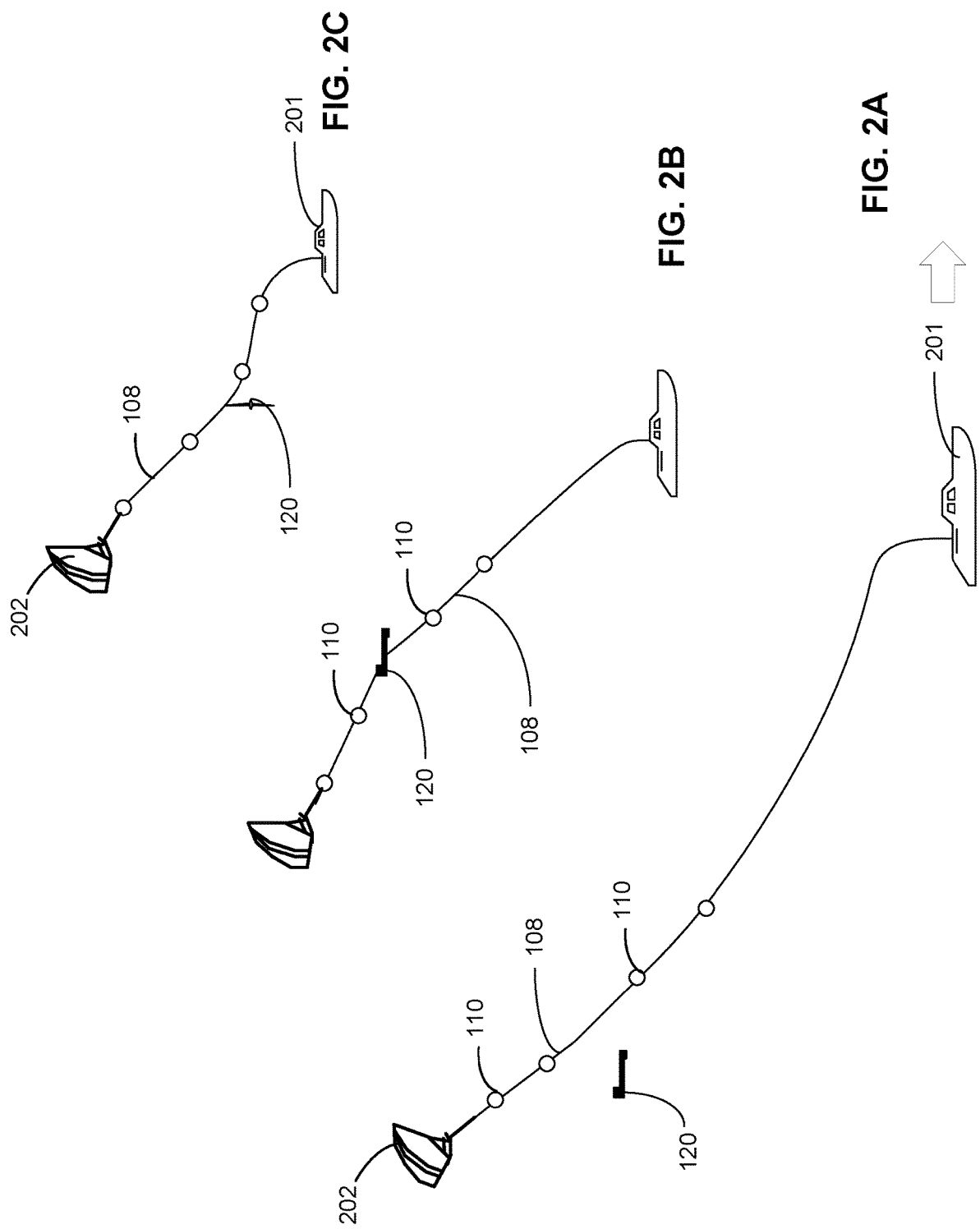
FIGS. 2A-2C depict an example recovery sequence in accordance with teachings of this disclosure.

To guide the UAV 120 of FIGS. 1-2C to be captured by the tether line 108, the markers 110 are detected by the sensor 130 of the UAV 120. In this example, the markers 110 are generally round and/or circular in shape (e.g., circular disks, spheroid volumes, oval-like outer shapes, etc.) so that centers (e.g., geometric sensors) of the markers 110 can be calculated by the flight controller 132 based on sensor data from the sensor 130. In turn, the centers of the markers 110 are utilized by the flight controller 132 to determine a position and/or spatial definition of at least a portion of the tether line 108 based on a known/pre-determined distance between at least two of the markers 110. In particular, the determination of a distance and/or heading between the UAV 120 to at least a portion of tether line 108 is determined (e.g., via triangulation, geometric calculations involving angles of the markers 110 from the UAV 120, etc.) by the flight controller 132 to direct movement of the UAV 120. In some examples, the UAV 120 is directed by the flight controller 132 to contact proximate or at a center distance between two of the markers 110. In other words, contact of the UAV 120 with the tether line 108 can occur generally equidistant from adjacent ones of the markers 110.

In some examples, multiple distances between the markers 110 are calculated to determine the distance and/or the heading between the UAV 120 and the tether line 108. Additionally or alternatively, the UAV 120 repeatedly and/or continuously (e.g., substantially in real time) detects and analyzes the positions (e.g., relative positions, longitudinal positions) of the markers 110 as the UAV 120 approaches the tether line 108. In some examples, an orientation (e.g., a tilt from vertical) of the tether line 108 is determined by the flight controller 132 based on the detected and/or determined positions of the markers 110. As will be discussed in greater detail below in connection with FIGS. 4A-5, in some examples, information is conveyed to the UAV 120 and/or the flight controller 132 via the markers 110 (e.g., shapes of the markers 110, indicators on the markers 110, sequences of the markers 110, which one of the payloads 125 to be dropped off, etc.). In some examples, the flight controller 132 identifies and/or determines the distances 302 between the markers 110 based on a number of the markers 110 (e.g., five of the markers 110 indicates that the distances 302a, 302b, 302c, 302d are each 1.0 meter). In some examples, the flight controller 132 determines a curvature and/or twist of the tether line 108 based on the detected markers 110. In some examples, the flight controller 132 utilizes at least one distance between non-adjacent ones of the markers 110. Additionally or alternatively, the flight controller 132 utilizes distances between the markers 110 that are overlapping.

While five of the example markers 110 are shown in this example, any appropriate number (e.g., two, three, four, six, seven, eight, nine, ten, fifteen, twenty, thirty, fifty, etc.) of the markers 110 can be implemented instead. In some particular examples, only two of the markers 110 are implemented. Further, the tether line 108 can be implemented by any appropriate methodology, structure and/or construction, such as those shown and described in connection with U.S. Pat. No. 10,933,997, entitled "Aerial launch and/or recovery for unmanned aircraft, and associated systems and methods," which is hereby incorporated by reference.

In some examples, the markers 110 are at least partially composed of a reflective material. In some such examples, the markers 110 can reflect light (e.g., visible light), infrared signals, lasers, etc. emitted from the UAV 120 so that the UAV 120 can utilize corresponding reflected signals to determine positions of the markers 110. In some examples, a range-finder system is implemented on at least one of the markers 110 and/or the UAV 120.

Figure 4A:
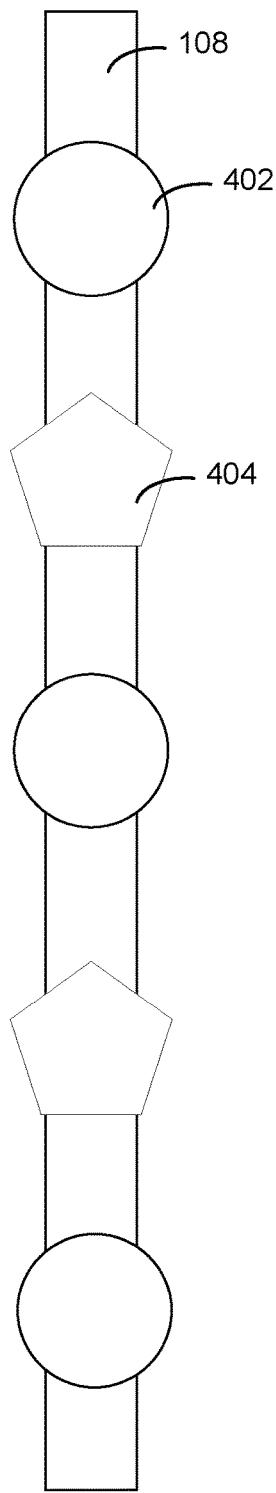
FIGS. 4A-4F depict alternative example marker implementations that can be implemented in examples disclosed herein.

FIGS. 4A-4F depict alternative example marker implementations that can be implemented in examples disclosed herein. Turning to FIG. 4A. the tether line 108 supports markers 402, 404 along a longitudinal length thereof. In this example, the markers 402, 404 have different shapes to convey information (e.g., parameters associated with the tether line 108) to the flight controller 132 via the sensor 130 shown in FIG. 1. For example, a sequence of the differently shaped markers 402, 404 can convey a distance between the markers 402, 404 (e.g., a circle with a pentagon below is associated with a defined distance between the markers 402, 404). Additionally or alternatively, colors of the markers 402, 404 are varied to convey information to the flight controller 132 via the sensor 130.

Figure 4B:
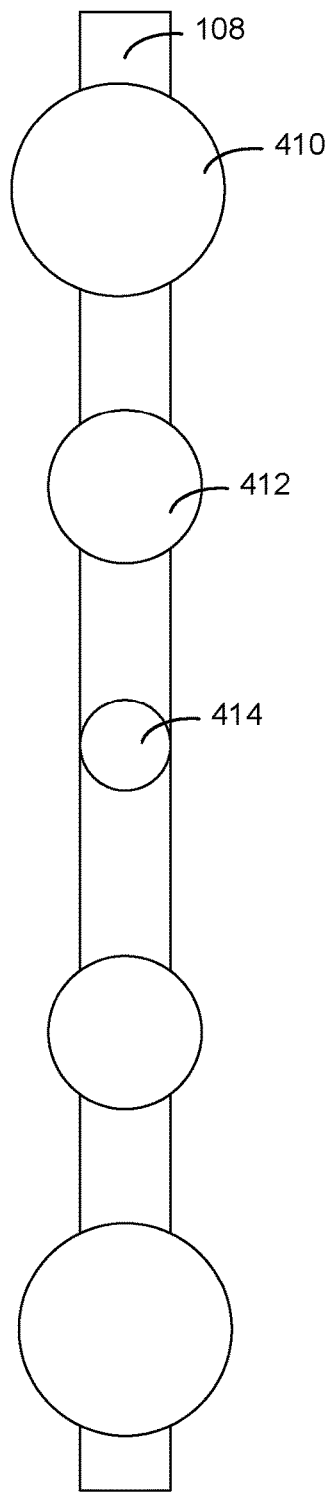

FIG. 4B depicts an example marker implementation in which markers 410, 412, 414 have different sizes (e.g., outer dimensions, outer radii, etc.). In the illustrated example, the different sizes can convey information (e.g., distance information, a space or position for the UAV 120 to contact the tether line 108, etc.) to the flight controller 132. Additionally or alternatively, colors of the markers 410, 412, 414 are varied to convey information to the flight controller 132. In some examples, the different sizes could be conveyed as different lengths in a pattern that convey information in a Morse-code-like message. Additionally or alternatively, different portions of the tether line 108 are painted and/or wrapped to facilitate conveyance of this information.

Figure 4C:
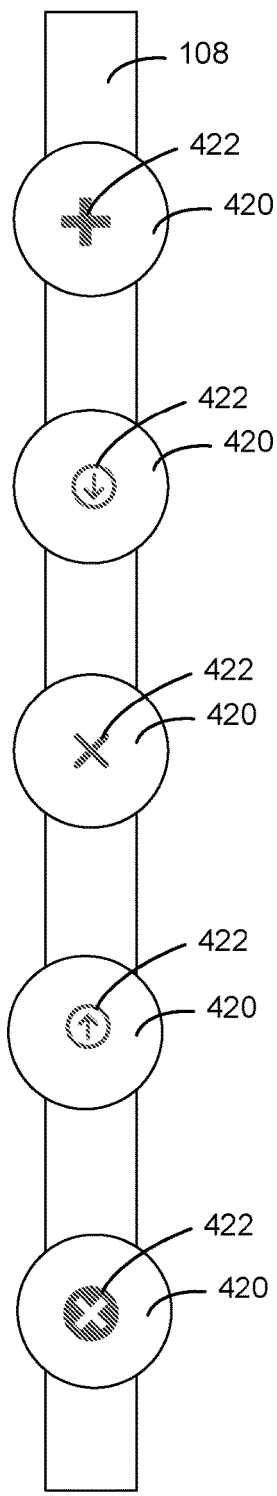

Turning to FIG. 4C, example markers 420 with readable indicators 422 are shown positioned on the tether line 108. In this example, the indicators 422, some of which are different from one another, are implemented to convey information to the flight controller 132. In some examples, a combination of the indicators 422 indicates information, such as at least one distance between the markers 420, for example. In some examples, the indicators 422 are symmetrically arranged to direct the UAV 120 to contact a section and/or segment of the tether line 108.

Figure 4D:
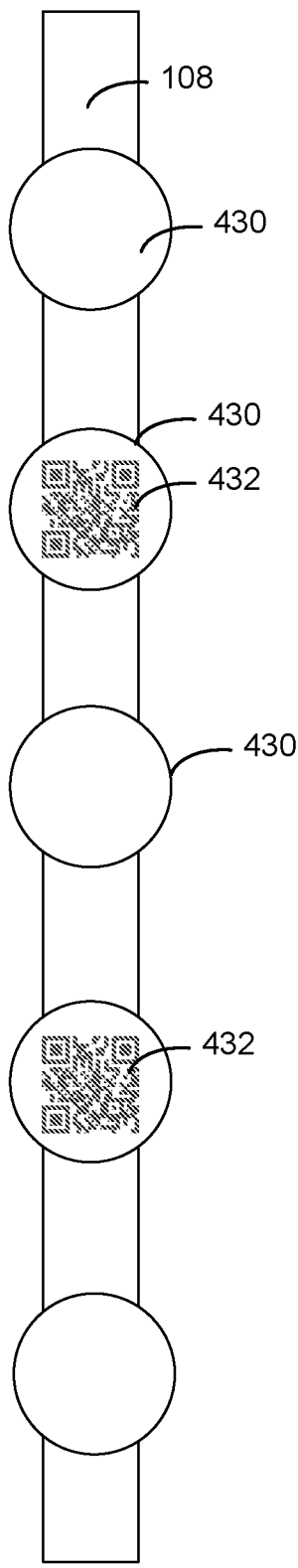

FIG. 4D depicts the tether line 108 with markers 430 mounted thereto. In this example, at least one of the markers 430 includes a readable indicator (e.g., a machine readable indicator) 432. In this particular example, two of the readable indicators 432 are implemented on the markers 430. Further, the indicators 432 are implemented as QR codes. However, any other type of readable indicator (e.g., a bar code, text, etc.) can be implemented instead.

Figure 4E:
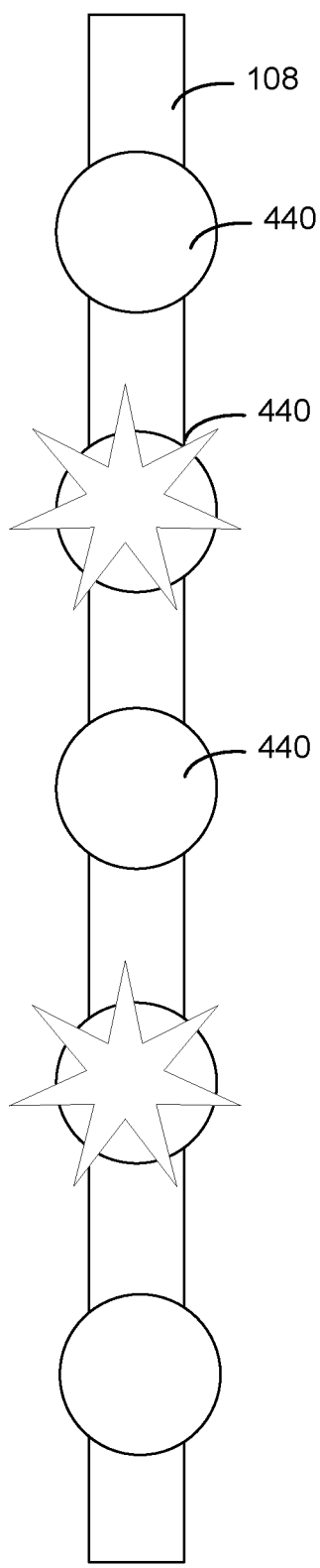
Figure 4F:
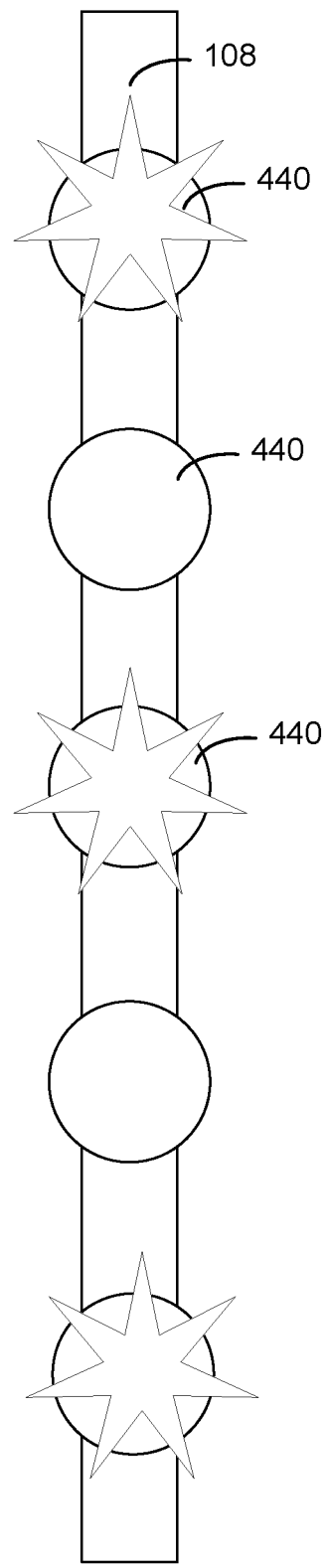

FIGS. 4E and 4F depict an example marker implementation in which markers are illuminated. Turning to FIG. 4E, the example tether line 108 is shown supporting markers 440. In this example, at least one of the markers is illuminated to guide the UAV 120 and/or convey information to the flight controller 132 via the sensor 130. In some examples, at least one of the markers 440 is illuminated at pre-defined time intervals (e.g., strobed, blinking, etc.).

FIG. 4F depicts an example in which different ones of the markers 440 are illuminated from the example shown in FIG. 4E. In particular, FIG. 4F depicts the example marker implementation of FIG. 4F, but at a different time. In some examples, different ones of the markers 440 are illuminated at different time intervals to convey information to the flight controller 132. In other words, different ones of the markers 440 can be illuminated in a pattern to convey information to the flight controller 132.

Any aspect of the example marker implementations shown in FIGS. 3-4F can be combined and/or integrated with any other aspect of the example marker implementations. In some examples, the information conveyed to the flight controller 132 can include, but is not limited to line tension, tether material, time/date, status of the tether line 108 (e.g., whether the tether line 108 is in service/available), etc. In some examples, the tether line 108 moves (e.g., rotates) and/or acts similar to a barber pole to convey information to the flight controller 132. Additionally or alternatively, the information conveyed to the flight controller 132 from the tether line 108 can convey emergency communications or status (e.g., whether lights and/or radio cannot convey information used for guidance of the UAV 120).

Figure 5:
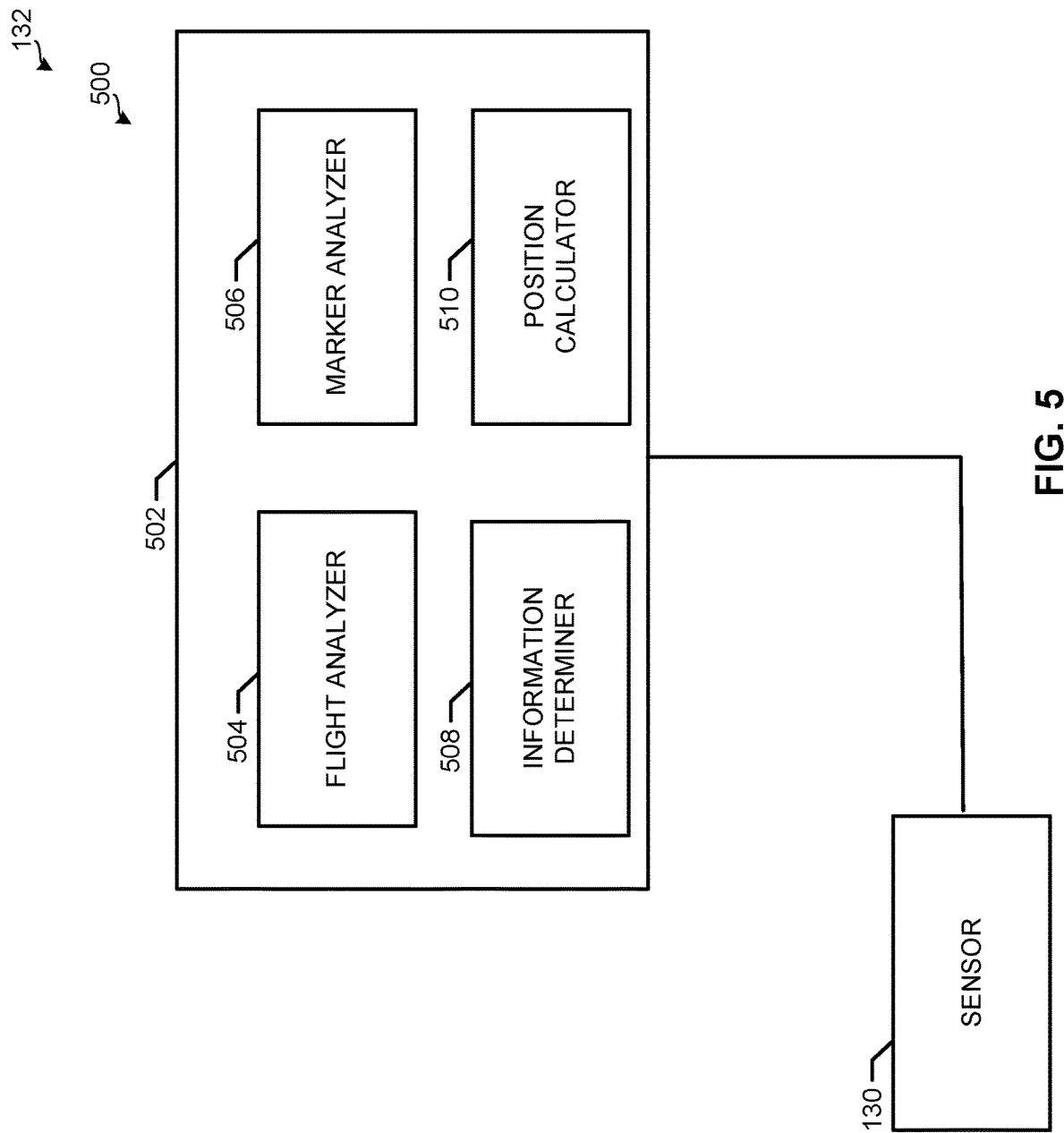
FIG. 5 is a schematic overview of an example aircraft guidance analyzer system that can be implemented in examples disclosed herein.

FIG. 5 is a schematic overview of an example aircraft guidance analyzer system 500 that can be implemented in the UAV 120 and/or the flight controller 132 of FIG. 1. The example aircraft guidance analyzer system 500 includes a flight director 502 which, in turn, includes a flight analyzer 504, a marker analyzer 506, an information determiner 508 and a position calculator 510. In this example, the flight director 502 is communicatively coupled to the sensor 130, which is implemented as an optical sensor (e.g., a camera) to detect markers (e.g., the markers 110, 402, 404, 410, 412, 420, 430, 440). However, any appropriate sensor type can be implemented instead.

The example marker analyzer 506 calculates and/or determines positions (e.g., center positions). In the illustrated example of FIG. 5, the marker analyzer 506 determines geometric centers of the markers. Additionally or alternatively, markings and/or indicia of the markers facilitates determination of the positions by the example marker analyzer 506.

The position calculator 510 of the illustrated example calculates a position (e.g., a relative position) of at least a portion of the tether line 108 relative to the UAV 120 based on the determined positions of the markers from the example marker analyzer 506. In this example, the position calculator 510 determines the position based on angles of the markers relative to the UAV 120 in combination with a known or pre-defined distance between ones of the markers (e.g., between adjacent ones of the markers). Additionally or alternatively, triangulation is employed with the positions of the markers. For example, a geometric calculation of position(s) of at least a portion of the tether line 108 can be determined based on the identified positions of the markers. Additionally or alternatively, the example position calculator 510 determines positions of multiple segments of the tether line 108. In some examples, a 3-D spatial representation of the tether line 108 is generated.

The flight analyzer 504 of the illustrated example controls and/or directs movement of the UAV 120. In this example, the flight analyzer 504 guides flight of the UAV 120 based on the calculated position of the tether line 108 and/or a portion of the tether line 108. The portion of the tether line 108 can be associated with a section of the tether line 108 that is positioned between two adjacent ones of the markers.

In some examples, the information determiner 508 is implemented to determine information from markers and/or arrangements of the markers on the tether line 108, as discussed above in connection with FIGS. 4A-4F. For example, the information can pertain to at least one distance between the markers. Additionally or alternatively, the information can correspond to properties of the tether line 108, such as, but not limited to, geometric properties of the tether line 108, elastic properties of the tether line 108, a marker configuration and/or arrangement of the tether line 108, etc. In some examples, the information determiner 508 determines information of the makers based on the markers being illuminated (e.g., illuminated in a sequential pattern).

While an example manner of implementing the aircraft guidance analyzer system 500 of FIG. 5 is illustrated in FIG. 5 one or more of the elements, processes and/or devices illustrated in FIG. 5 may be combined, divided, re-arranged, omitted, eliminated and/or implemented in any other way. Further, the example flight analyzer 504, the example marker analyzer 506, the example information determiner 508, the example position calculator 510 and/or, more generally, the example aircraft guidance analyzer system 500 of FIG. 5 may be implemented by hardware, software, firmware and/or any combination of hardware, software and/or firmware. Thus, for example, any of the example flight analyzer 504, the example marker analyzer 506, the example information determiner 508, the example position calculator 510 and/or, more generally, the example aircraft guidance analyzer system 500 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example flight analyzer 504, the example marker analyzer 506, the example information determiner 508, and/or the example position calculator 510 is/are hereby expressly defined to include a non-transitory computer readable storage device or storage disk such as a memory, a digital versatile disk (DVD), a compact disk (CD), a Blu-ray disk, etc. including the software and/or firmware. Further still, the example aircraft guidance analyzer system 500 of FIG. 5 may include one or more elements, processes and/or devices in addition to, or instead of, those illustrated in FIG. 5, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
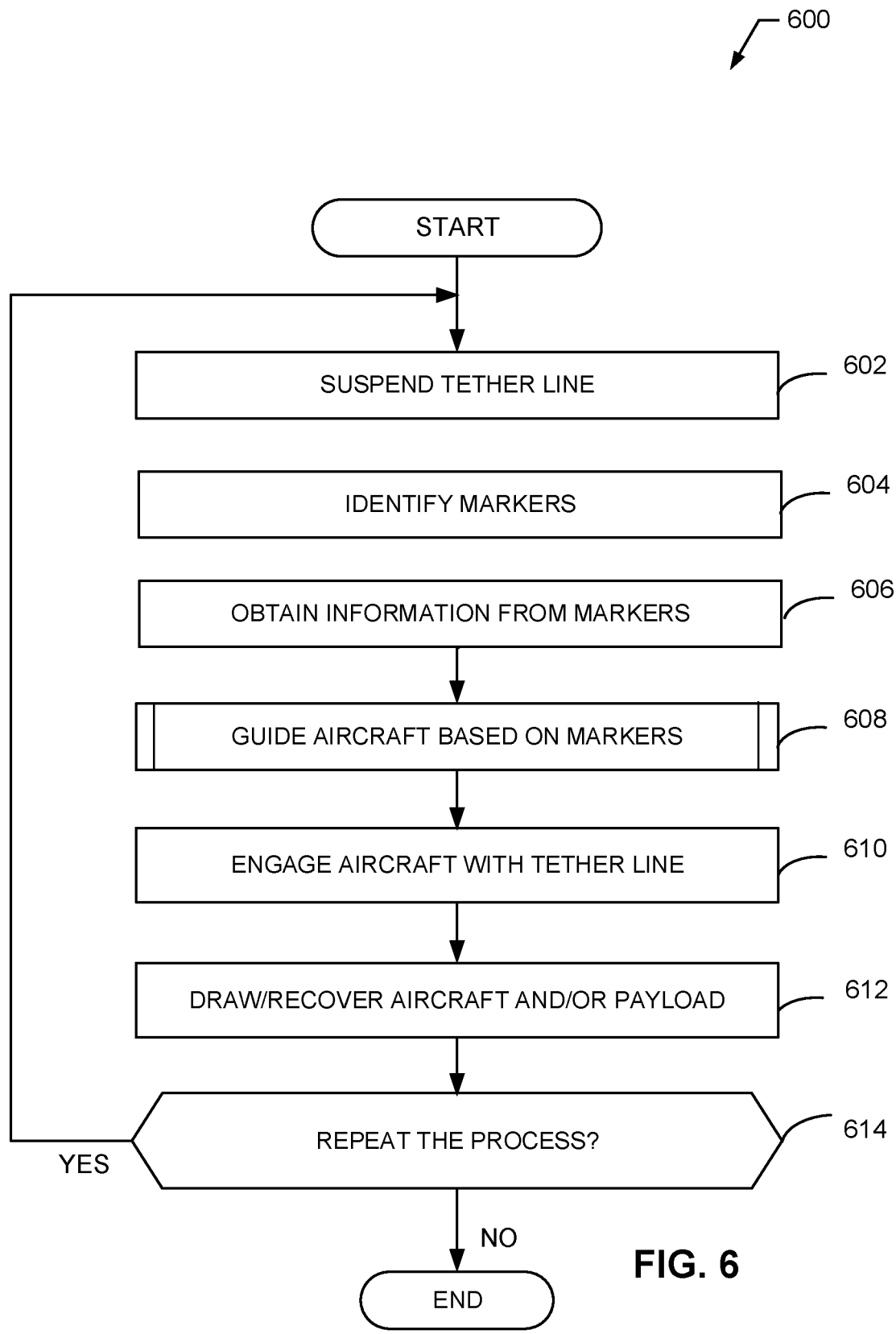
FIG. 6 is a flowchart representative of machine readable instructions which may be executed to implement the example UAV recovery system of FIG. 1 and/or the example aircraft guidance analyzer system of FIG. 5.
Figure 7:
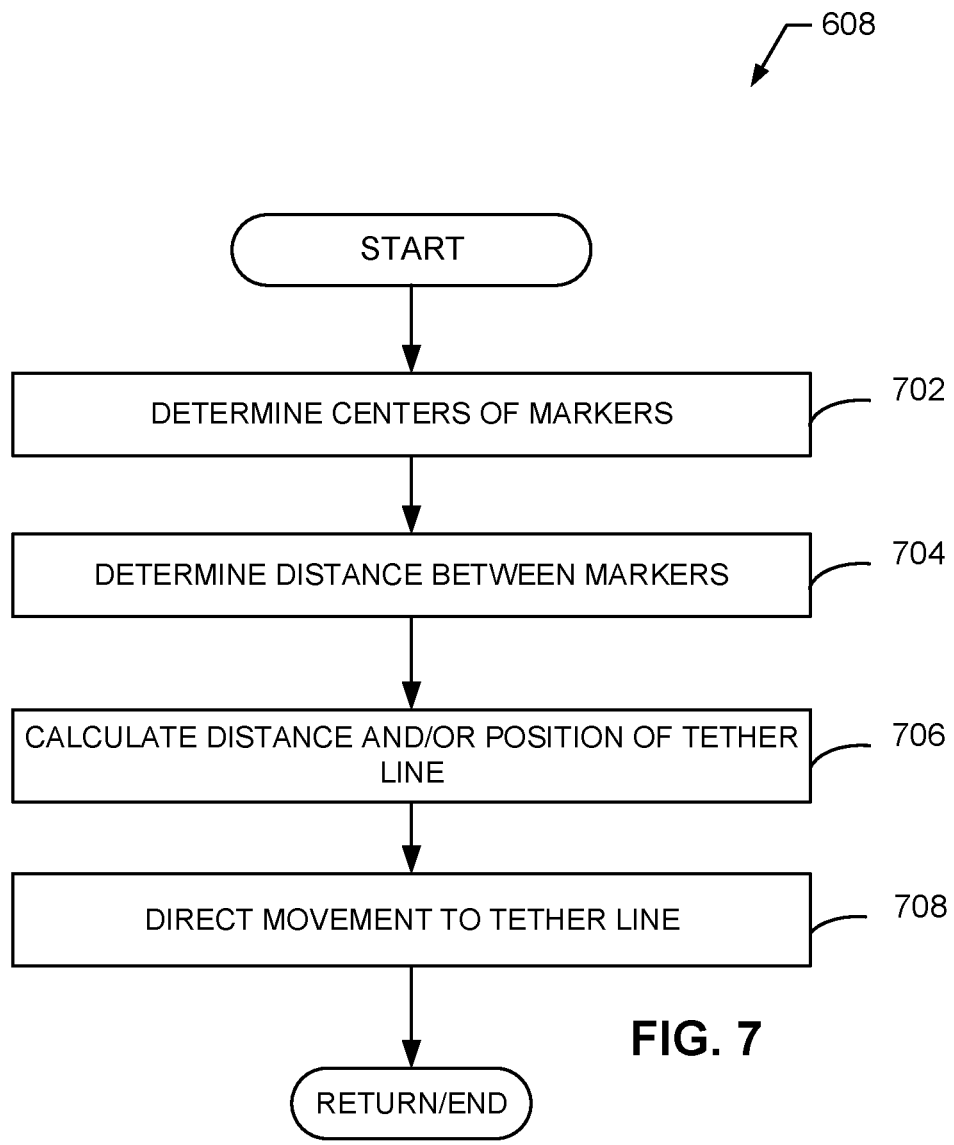
FIG. 7 is a flowchart representative of an example subroutine of the example machine readable instructions of FIG. 6.

Flowcharts representative of example hardware logic, machine readable instructions, hardware implemented state machines, and/or any combination thereof for implementing the aircraft guidance analyzer system 500 of FIG. 5 are shown in FIGS. 6 and 7. The machine readable instructions may be one or more executable programs or portion(s) of an executable program for execution by a computer processor and/or processor circuitry, such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowcharts illustrated in FIGS. 6 and 7, many other methods of implementing the example aircraft guidance analyzer system 500 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 6 and 7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

The example method 600 of FIG. 6 begins as an aircraft (e.g., the UAV 120) is to be guided by markers (e.g., the markers 110, 402, 404, 410, 412, 420, 430, 440) for recovery of the aircraft. In particular, the aircraft is to be guided by the markers direct the aircraft to contact with the tether line 108. In other examples, the aircraft is guided toward the tether line 108 for recovery of the payload 125 carried by the aircraft.

At block 602, the tether line 108 is suspended. In the illustrated example, the tether line 108 is suspended generally vertically with respect to Earth. In some examples, a tension of the tether line 108 is maintained by the tensioner 111 to facilitate stability of the tether line 108 and/or recovery of the aircraft.

At block 604, the marker analyzer 506 of the illustrated example identifies the markers. In particular, the example marker analyzer 506 determines a presence of the markers based on data from the sensor 130 for subsequent determination of at least one distance and/or angular displacement from the markers (e.g., between two adjacent markers) to the aircraft.

At block 606, in some examples, the information determiner 508 determines information from the markers and/or an arrangement of the markers. For example, shapes and/or other external features of the markers can indicate a distance between adjacent ones of the markers and/or a portion of the tether line 108 to which the aircraft is to be directed.

At block 608, as will be discussed in greater detail below in connection with FIG. 7, the aircraft is guided toward the tether line 108 based on the markers detected by the sensor 130.

At block 610, the aircraft is caused to engage the tether line 108. In this example, at least a portion of the aircraft contacts and is captured by the tether line 108. In some examples, the aircraft is controlled to impact the tether line 108 at a defined speed range. In some other examples, the aircraft engages the tether line 108 by causing the payload 125 to contact the tether line 108.

At block 612, the aircraft and/or the payload 125 is drawn and/or recovered via the tether line 108. In this example, the aircraft is drawn toward the vessel 201 for recovery of the aircraft. In other examples, the aircraft is drawn toward a stationary ground-based structure on land.

At block 614, it is determined whether to repeat the process. If the process is to be repeated (block 614), control of the process returns to block 602. Otherwise, the process ends. This determination may be based on whether additional aircraft are to be recovered.

Turning to FIG. 7, the example subroutine 608 begins as the aircraft is directed to fly toward the tether line 108 for recovery. In this example, the aircraft is being guided to impact the tether line 108.

At block 702, the example marker analyzer 506 determines centers of the markers. In this particular example, the marker analyzer 506 calculates and/or identifies geometric centers of the markers based on data (e.g., image data) from the sensor 130.

At block 704, the example marker analyzer 506 determines a distance and/or angular displacement between the markers. In the illustrated example, the distance and/or angular displacement is known. In other examples, the distance and/or angular displacement is conveyed via the markers.

At block 706, the position calculator 510 of the illustrated example calculates a distance and/or position of the tether line 108 (e.g., a portion of the tether line 108 to contact the aircraft) relative to the aircraft based on the positions of the markers. Additionally or alternatively, the example position calculator calculates an orientation and/or spatial representation of at least a portion of the tether line 108 (e.g., a portion of the tether line 108 between adjacent ones of the markers).

At block 708, the example flight analyzer 504 controls and/or directs movement of the aircraft to the tether line 108 and the process ends/returns. In particular, the movement of the aircraft (e.g., a heading and altitude of the aircraft) is directed based on the calculated position and/or distance of the tether line 108 determined by the position calculator 510, for example. In some examples, the flight analyzer 504 controls the aircraft in substantially real time toward the tether line 108. In some such examples, sensor data from the sensor 130 pertaining to the markers is continuously and/or periodically analyzed as the aircraft moves closer to the tether line 108.

Figure 8:
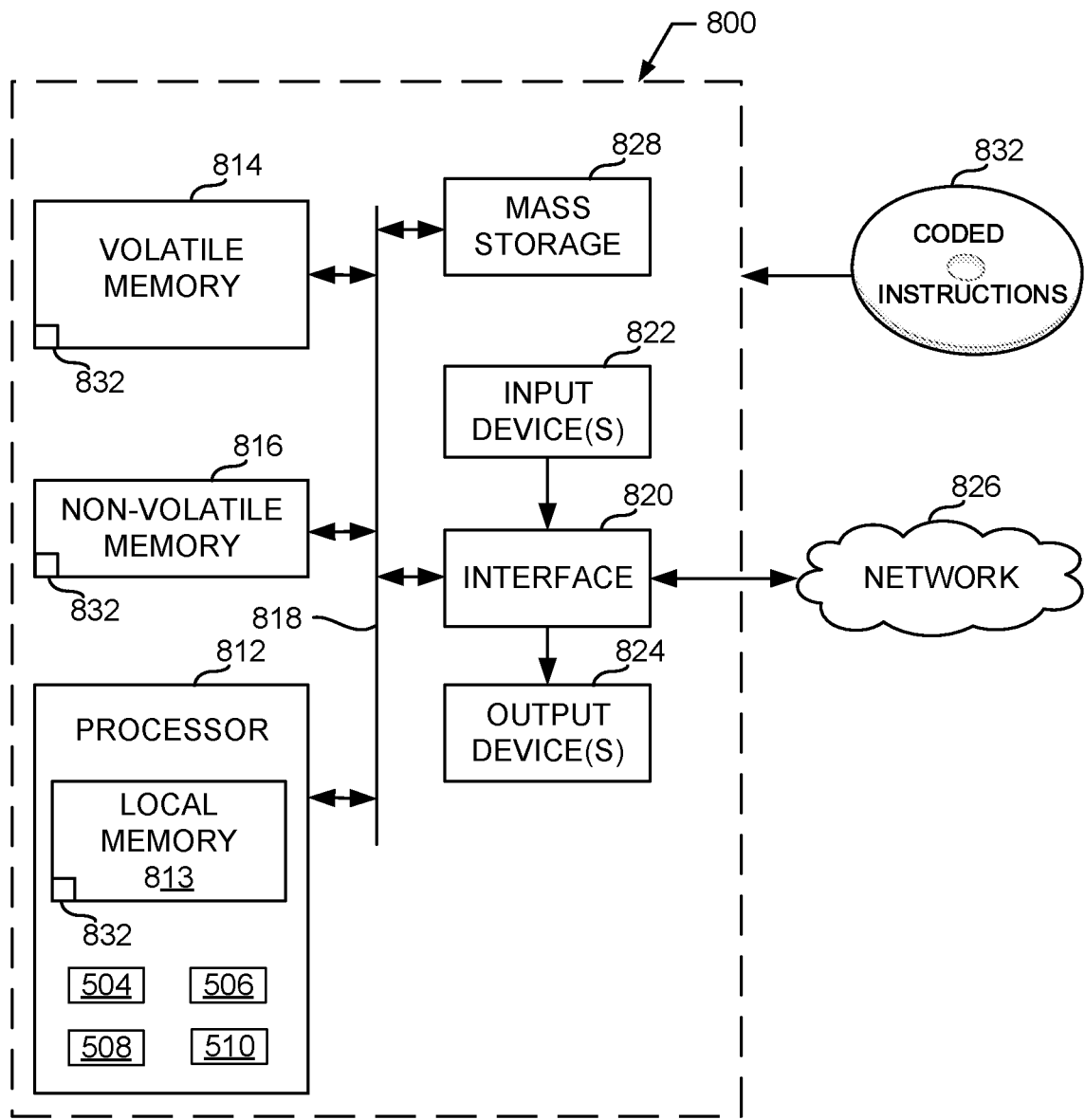
FIG. 8 is a block diagram of an example processing platform structured to execute the instructions of FIGS. 6 and 7 to implement the example UAV recovery system of FIG. 1 and/or the example aircraft guidance analyzer system of FIG. 5.

FIG. 8 is a block diagram of an example processor platform 800 structured to execute the instructions of FIGS. 6 and 7 to implement the aircraft guidance analyzer system 500 of FIG. 5. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example flight analyzer 504, the example marker analyzer 506, the example information determiner 508, and the example position calculator 510.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIGS. 6 and 7 may be stored in the mass storage device 828, in the volatile memory 814, in the non-volatile memory 816, and/or on a removable non-transitory computer readable storage medium such as a CD or DVD.

Example 1 includes an apparatus to recover an aircraft or a payload thereof. The apparatus includes a tether line, and markers supported by the tether line at different positions of the tether line, the markers to be detected by the aircraft, the aircraft to be guided to engage the tether line by determining positions of the markers and calculating a position of at least a portion of the tether line based on the determined position of the markers.

Example 2 includes the apparatus as defined in example 1, wherein a flight controller of the aircraft is to determine a position of the at least the portion of the tether line based on angles of ones of the markers relative to the aircraft.

Example 3 includes the apparatus as defined in any of examples 1 or 2, wherein a flight controller of the aircraft is to determine at least one parameter associated with the tether line by determining at least one of a shape, size or indicator of the markers.

Example 4 includes the apparatus as defined in example 3, wherein at least two of the markers include different shapes, the flight controller to determine the at least one parameter based on the different shapes.

Example 5 includes the apparatus as defined in any of examples 3 or 4, wherein ones of the markers have different sizes, the flight controller to determine the at least one parameter based on the different sizes.

Example 6 includes the apparatus as defined in any of examples 1 to 5, wherein three of the markers are spaced apart from one another at equal intervals.

Example 7 includes the apparatus as defined in any of examples 1 to 6, wherein the markers include at least one indicator to be read by a sensor of the aircraft.

Example 8 includes the apparatus as defined in any of examples 1 to 7, wherein the markers are reflective to visible light, laser or infrared emitted from the aircraft.

Example 9 includes the apparatus as defined in any of examples 1 to 8, wherein the markers are illuminated.

Example 10 includes a non-transitory computer readable medium having instructions, which when executed, cause at least one processor to determine positions of markers on a tether line, the markers placed at different positions of the tether line, calculate a position of at least a portion of the tether line based on the determined positions of the markers, and direct movement of an aircraft to engage the tether line based on the calculation position for recovery of the aircraft or a payload thereof.

Example 11 includes the non-transitory computer readable medium as defined in example 10, wherein the position of the tether line is calculated based on angles of ones of the markers relative to the aircraft.

Example 12 includes the non-transitory computer readable medium as defined in any of examples 10 or 11, wherein the movement of the aircraft is directed so that the aircraft contacts the tether line between two adjacent ones of the markers.

Example 13 includes the non-transitory computer readable medium as defined in any of examples 10 to 12, wherein the instructions cause the at least one processor to determine at least one parameter of the markers based on detected shapes of the markers.

Example 14 includes the non-transitory computer readable medium as defined in example 13, wherein the at least one parameter of the markers includes a distance between at least two of the markers.

Example 15 includes the non-transitory computer readable medium as defined in example 14, wherein the instructions cause the at least one processor to determine centers of the markers based on sensor data.

Example 16 includes a method to guide an aircraft. The method includes determining positions of markers, the markers placed at different positions of a tether line, calculating, by executing instructions with at least one processor, a position of at least a portion of the tether line based on the determined positions of the markers, and guiding the aircraft toward the tether line based on the calculated position of the at least the portion of the tether line for recovery of the aircraft or a payload thereof.

Example 17 includes the method as defined in example 16, wherein the determining of the positions is based on at least one of light, infrared signals or lasers emitted from the aircraft being reflected from the markers.

Example 18 includes the method as defined in any of examples 16 or 17, wherein the guiding of the aircraft includes guiding the aircraft toward a center between two adjacent ones of the markers.

Example 19 includes the method as defined in any of examples 16 to 18, further including determining, by executing instructions with the at least one processor, at least one parameter of the markers based on detected shapes of the markers.

Example 20 includes the method as defined in any of examples 16 to 19, further including determining, by executing instructions with the at least one processor, at least one parameter of the markers based on reading an indicator of at least one of the markers.

From the foregoing, it will be appreciated that example methods, apparatus and articles of manufacture have been disclosed that enable accurate recovery of aircraft, such as UAVs. Further, examples disclosed herein enable covert operation of aircraft by reducing and/or eliminating a need for signals for guidance associated with the aircraft. Accordingly, examples disclosed herein can be utilized in guidance of aircraft without active signals (e.g., low signature signals). Examples disclosed herein can also be cost effective by eliminating complex and relatively expensive guidance systems. Examples disclosed herein can enable recovery and guidance of aircraft in low visibility conditions. Examples disclosed herein can also be implemented in low visibility conditions and/or reduced line of sight conditions, such as when an aircraft does not have a line of sight to a base station (e.g., the base station is behind a wall, cliff, tree-line, etc. or is inaccessible).

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to recover an aircraft or a payload carried thereby, the apparatus comprising:
a tether line; and
markers supported by the tether line at different positions of the tether line, the markers to be detected by the aircraft, the aircraft to be guided to engage the tether line by:
determining positions of the markers,
calculating a position of at least a portion of the tether line based on the determined position of the markers, and
directing, based on the position of the at least the portion of the tether line, movement of the aircraft to cause at least one of the aircraft or a payload carried by the aircraft to contact the tether line while the aircraft is in flight.

2. The apparatus as defined in claim 1, wherein a flight controller of the aircraft is to determine the position of the at least the portion of the tether line based on angles of ones of the markers relative to the aircraft.

3. The apparatus as defined in claim 1, wherein a flight controller of the aircraft is to determine at least one parameter associated with the tether line by determining at least one of a shape, size or indicator of the markers.

4. The apparatus as defined in claim 3, wherein at least two of the markers include different shapes, the flight controller to determine the at least one parameter based on the different shapes.

5. The apparatus as defined in claim 3, wherein ones of the markers have different sizes, the flight controller to determine the at least one parameter based on the different sizes.

6. The apparatus as defined in claim 1, wherein three of the markers are spaced apart from one another at equal intervals.

7. The apparatus as defined in claim 1, wherein the markers include at least one symbol to be read by a sensor of the aircraft.

8. The apparatus as defined in claim 1, wherein the markers are reflective to visible light, laser or infrared emitted from the aircraft.

9. The apparatus as defined in claim 1, wherein the markers are illuminated.

10. A non-transitory computer readable medium comprising instructions, which when executed, cause at least one processor to:
determine positions of markers placed on a tether line, the markers placed at different positions of the tether line;
calculate a position of at least portion of the tether line based on the determined positions of the markers; and
direct, based on the position of the at least the portion of the tether line, movement of an aircraft to cause the aircraft or a payload carried by the aircraft to contact and engage the tether line for recovery of at least one of the aircraft or the payload.

11. The non-transitory computer readable medium as defined in claim 10, wherein the position of at least the portion of the tether line is calculated based on angles of ones of the markers relative to the aircraft.

12. The non-transitory computer readable medium as defined in claim 10, wherein the movement of the aircraft is directed so that the aircraft contacts the tether line between two adjacent ones of the markers.

13. The non-transitory computer readable medium as defined in claim 10, wherein the instructions cause the at least one processor to determine at least one parameter of the markers based on detected shapes of the markers.

14. The non-transitory computer readable medium as defined in claim 13, wherein the at least one parameter of the markers includes a distance between at least two of the markers.

15. The non-transitory computer readable medium as defined in claim 14, wherein the instructions cause the at least one processor to determine centers of the markers based on sensor data.

16. A method to guide an aircraft, the method comprising:
determining positions of markers, the markers placed at different positions of a tether line;
calculating, by executing instructions with at least one processor, a position of at least a portion of the tether line based on the determined positions of the markers; and
guiding the aircraft that is at a distance from the tether line toward the tether line to contact the tether line based on the position of the at least the portion of the tether line for recovery of the aircraft or a payload thereof.

17. The method as defined in claim 16, wherein the determining of the positions is based on at least one of light, infrared signals or lasers emitted from the aircraft being reflected from the markers.

18. The method as defined in claim 16, wherein the guiding of the aircraft includes guiding the aircraft to contact a center position between two adjacent ones of the markers.

19. The method as defined in claim 16, further including determining, by executing instructions with the at least one processor, at least one parameter of the markers based on detected shapes of the markers.

20. The method as defined in claim 16, further including determining, by executing instructions with the at least one processor, at least one parameter of the markers based on reading a symbol of at least one of the markers.

21. The apparatus as defined in claim 2, wherein the flight controller of the aircraft is to direct the aircraft to cause a contact portion of the aircraft to contact and engage the tether line between two of the markers.

22. The apparatus as defined in claim 2, wherein the flight controller of the aircraft is to direct the aircraft to cause the contact portion of the aircraft to contact a midpoint between the two of the markers.

23. The apparatus as defined in claim 3, wherein the at least one parameter corresponds to at least one distance between ones of the markers.

* * * * *